ELECTRONIC PITCHING AID

Filed Aug. 16, 1962 2 Sheets-Sheet 1

INVENTORS
PENDLETON S. TOMPKINS
STUART W. GRINNELL
RONALD L. IVES
BY Lippincott, Ralls & Hendricson
ATTORNEYS INVENTORS
PENDLETON S. TOMPKINS
STUART W. GRINNELL
RONALD L. IVES
BY Lippincott, Ralls & Hendricson
ATTORNEYS United States Patent Office 3,229,975
Patented Jan. 18, 1966

3,229,975
ELECTRONIC PITCHING AID

Pendleton S. Tompkins, Hillsborough, Stuart W. Grinnell, Menlo Park, and Ronald L. Ives, Palo Alto, Calif., assignors, by mesne assignments, to General Indicator Corporation, Burlingame, Calif., a corporation of New York Filed Aug. 16, 1962, Ser. No. 217,412
7 Claims. (Cl. 273—26)

This invention relates to an electronic pitching aid. More specifically, the invention provides a matrix of photoelectric devices and associated electronic apparatus which provides a pitcher with the following information:

(1) Has a baseball been pitched (or has someone merely walked across home plate, or was a bat swung across home plate?)

(2) Was the pitch a "ball" or a "strike"?

(3) If a strike, was it in a corner, or was it in the center of the strike zone? If a ball, was it almost a strike, or was it "way outside"?

Electric strike callers are not new. For example, see U.S. Patent 2,113,899 and U.S. Patent 2,653,309. The invention described in both of these patents utilize photocells for calling strikes. However, neither of them provides any way of indicating the location of the ball within the strike or ball zones. The apparatus described in U.S. Patent 2,113,899 does not distinguish between a ball interrupting the beams of light and a bat interrupting them. Furthermore, a person walking across home plate would be interpreted as a strike. The device of U.S. Patent 2,653,309, on the other hand, does make some attempt to distinguish between a bat interrupting the light beams and a ball interrupting the light beams. However, the system employed uses a complex timing mechanism, depending upon the order in which three light beams are interrupted. The circuitry involved is extremely complex, and in spite of the complexity, the apparatus does not give any indication of where the pitch crossed the strike zone.

The electronic pitching aid of this invention overcomes all of the disadvantages associated with the prior art. The device not only tells whether the pitch is a ball or a strike, but where it crossed the respective zones. Furthermore, the apparatus may be adjusted so that it is not actuated by anything but a pitched ball. A person walking across home plate or the swing of a bat will not give a signal on the indicator.

Briefly, the apparatus of this invention uses a matrix of photoelectric devices, each having an artificial light source and a photocell. Each of the photoelectric devices provides a signal when its light source is interrupted from striking its photocell. The grid-like matrix of photoelectric devices has openings smaller than the size of a baseball. A baseball pitched through the matrix will interrupt at least two light beams. The matrix covers the strike zone, and preferably also includes the fringe areas near the strike zone, so that an indication is given for a "near miss." The size of the matrix is preferably adjustable, particularly vertically, because the height of the strike zone varies with the height of the batter.

The signals from each of the photoelectric devices in the matrix are individually interpreted by a sorting apparatus. This sorting apparatus uses a resistor and a capacitor, preferably one of low capacitance. The output of this sorting apparatus is passed to an amplifying means, such as a transistor amplifier, a vacuum tube amplifier, or some combination of one or more of the two. The sorting apparatus blocks a pulse which is slower than the pulse caused by a "slow ball." Therefore, even when amplified, the signal from such a slow pulse is insufficient to switch a switching apparatus. A slow ball is pitched at about 40 feet per second, and a fast ball at about 140 feet per second. Since the artificial light sources in the matrix are only about 1–2 inches in diameter, a fast ball interrupts all or a portion of one of these light beams for a total duration of about 1 millisecond. A slow ball, on the other hand, interrupts the light for about 4 milliseconds. The total actual interruption time, however, of spurious interruptions caused by a person walking (or running) across home plate, or by a bat swinging across it, is considerably longer than the 4 millisecond interruption of a slow ball. By properly choosing the value of the capacitor and resistor of the sorting circuit, and by adjusting the sensitivity of the switching circuit, it is possible to discriminate effectively between these spurious interruptions and the desired interruptions caused by a pitched ball.

During half of the interruption time, the light intensity striking the photocell is decreasing as the ball passes into the beam; during the other half of the interruption time, the light is increasing as the ball passes out of the beam. The switching device is switched by the rise of the light intensity or its fall, not by both. The effective interruption for switching is only about half the total interruption duration. Therefore, the effective pulse duration is about 0.5 millisecond for a fast ball and about 2 milliseconds for a slow ball.

The indicating portion of the apparatus is an indicator panel having a matrix of lights corresponding to the matrix of photoelectric devices. Each of these lights is connected to two switching circuits associated with two photoelectric devices having intersecting light beams. The lights correspond to the intersections of the artificial light sources in the matrix of photoelectric devices. When a pitched ball interrupts such an intersection, the sorting apparatus will pass the resulting signal and corresponding lights will be switched on. These lights correspond to the area of the strike or ball zone through which the ball passed. As many as four lights may be switched on. Since the matrix or grid area is slightly smaller than the size of the ball, it is possible though not likely, for the ball to interrupt eight matrixing light beams (having four intersections). Then four lights would be turned on in the light matrix simultaneously. In most cases, however, the ball interrupts only two, or at most four, light beams (one or two intersections); therefore, only one, or at most two, lights on the indicator are turned on by the switching apparatus.

The invention may be better understood by reference to the following more detailed description and drawings, in which.

Figure 1:
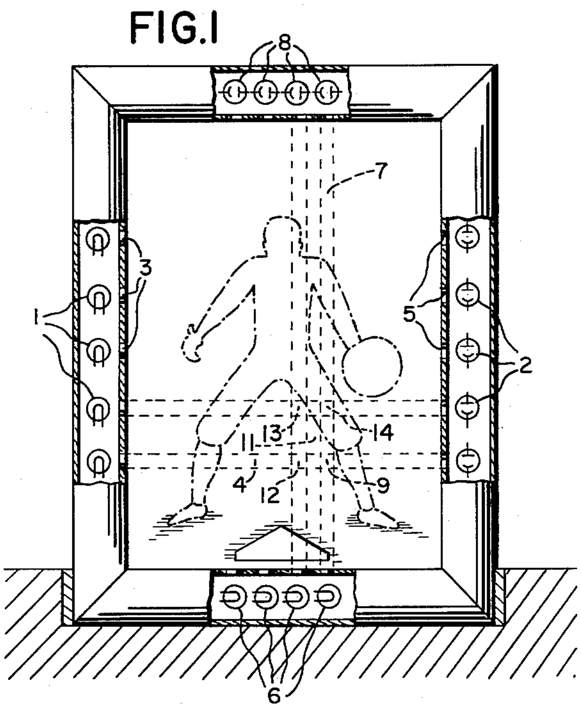
FIG. 1 is a somewhat schematic illustration of the apparatus holding the matrix of photoelectric devices of the invention, showing the location of the catcher.

Referring to FIG. 1, an illustrated device of the invention having nine photoelectric devices is shown. Each of these devices has an artificial light source 1 and an associated photocell 2. The beam 4 from light source 1 is directed by a lens 3 into opening 5 of the frame, to hit up one of the photocells 2. Vertical light source 6 transmits a vertical light beam 7 to hit photocell 8. The point 9 where beams 4 and 7 cross is representative of the twenty such crossing points of the nine beams from the nine photoelectric devices shown. A ball intercepting any one of these points intercepts two beams of two photoelectric devices.

Figure 2:
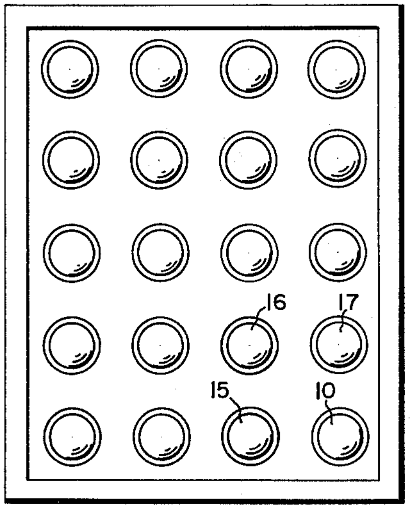
FIG. 2 is a somewhat schematic illustration of the indicator panel which shows where the ball crossed the plate.

Each photoelectric device has its own pulse-sorting apparatus, its own amplifier, and its own switching apparatus. However, two switches must be switched by signals from two photoelectric devices (as by a ball intercepting beams 4 and 7) and point 9) in order to cause one light (corresponding to point 9) to light up on the indicator panel. Referring to FIGS. 1 and 2, suppose a ball passed through point 9, intercepting beams 4 and 7. A signal would be sent to the two pulse sorting circuits through their two amplifiers, and into the two switching circuits associated with the two photoelectric devices of beams 4 and 7. This would light up light 10, shown on FIG. 2. Light 10 is one of the twenty lights in the indicator panel which correspond to the twenty points of intersection of the nine light beams.

The size of the spaces in the matrix are regulated so that a ball passing through would necessarily intercept at least one of the twenty crossing points. Because of this restriction, it is possible for a ball passing directly through the center of one square to intercept four intersections. A ball through the center of square 11 (FIG. 1) intercepts intersections 9, 12, 13, and 14. In this instance, not only would light 10 (FIG. 2) be turned on, but also lights 15, 16, and 17. When all four of these lights are lighted, one would know that a ball had passed exactly through the center of the space in the strike zone indicated by lights 10, 15, 16, and 16 (FIG.2). In most cases, however, only one intersection of light beams would be interrupted. Therefore, only one light of the indicator panel, shown in FIG. 2, would be lighted.

The individual circuitry of the invention associated with each photoelectric device includes a pulse-sorting circuit, an amplifying circuit (which preferably includes one or more transistor amplifiers and a vacuum tube amplifier), and a switching circuit. The combined switching circuits of all the photoelectric devices operate the light matrix.

Figure 3:
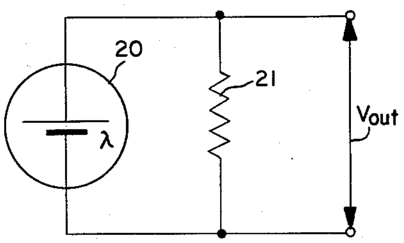
FIG. 3 is a schematic circuit diagram of one of the photoelectric devices.

The detector of the photoelectric device is shown in FIG. 3. Such devices are conventional. The one shown in FIG. 3 is a barrier type photocell, preferred because it requires no source of power other than the light itself. Photocell 20 has a resistor 21 shunting it. The value of this resistor is generally larger than the internal resistance of the photocell itself. This shunting resistor compensates for any variations which might be found between the individual photocells. The output voltage of the detector appears as shown. This voltage has a D.-C. level which is constant. The D.-C. level is a function of the normal output of the detector in response to the light beam and other incident light upon it. The voltage has an A.-C. spike (negative) when a light beam is intercepted.

Figure 4:
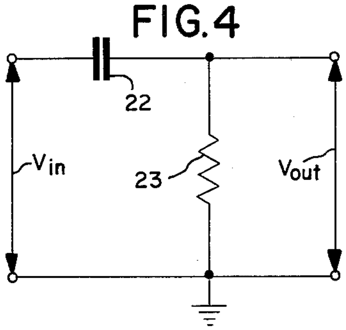
FIG. 4 is a schematic circuit diagram of a pulse sorting circuit.

The output voltage of the photocell becomes the input voltage of the pulse-sorting circuit shown in FIG. 4. The voltage passes through capacitor 22 and appears across resistor 23. Two factors affect the A.-C. voltage value across resistor 23. The first, of course, is the value of the resistor itself. The second is the A.-C. current through it. Capacitor 22 acts as a regulator of the A.-C. current through resistor 23. The A.-C. current permitted to pass through capacitor 22 (and therefore through resistor 23) is proportional both to the capacitance of the capacitor and to the rate of change of $V_{in}$ with respect to time $$\left(\frac{dV_{in}}{dt}\right)$$

The magnitude of capacitor 22 is kept very small, usually less than 1 $\mu$f. Therefore, when $$\frac{dV_{in}}{dt}$$

is also small because of a slow interruption (slower than a slow ball), the A.-C. current through resistor 23 and hence the output A.-C. voltage of the pluse-sorting circuit is essentially negligible. Therefore, for relatively long beam interruptions, there are no appreciable A.-C. voltage signals coming from the pulse-sorting circuits. However, for rapid interruptions, such as those produced by a baseball passing through a beam, $$\frac{dV_{in}}{dt}$$

is larger (*dt* is small) and the A.-C. current through resistor 23 and hence the A.-C. output voltage of the sorter is appreciable. This A.-C. voltage is amplified by the amplifying circuits and is then sufficient to trigger the switching circuit. The size of the capacitor and resistor may be regulated to achieve the proper relationship of output voltage and desired minimum beam interruption time. In practice, about a 4.7K ohm resistor and 0.25 $\mu$f. capacitor are used.

The output of the pulse-sorting device, shown in FIG. 4, becomes the input of the first stage of amplification. Preferably, the first stage of amplification is a transistor amplifier, such as the one shown in FIG. 5. The output signals of the photocells are very low level and thus extremely susceptible to picking up noise. It is very important to keep the noise from obscuring these very small signals. This is achieved by locating the first stage of amplification in close physical proximity to the photocells. Since the photocells are located directly in the ball-sensing apparatus (as shown in FIG. 1), the first stage of amplification is preferably located there. Since this apparatus is compact and is likely to be hit by pitched balls, the amplifier must be small and rugged. A transistor amplifier is excellent for this job.

Figure 5:
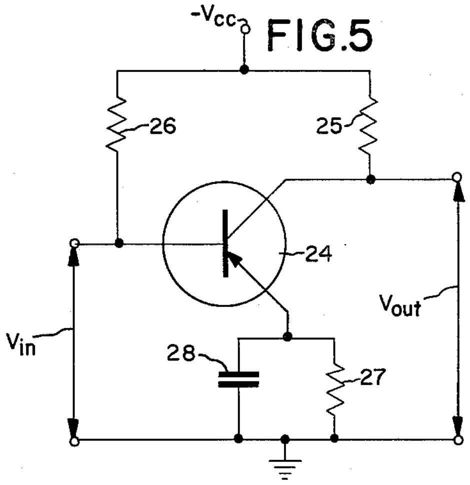
FIG. 5 is a schematic circuit diagram of a transistor amplifier.

In the circuit shown in FIG. 5, a 2N217 PNP transistor 24 is used. However, many other types of transistors may be used. With a suitable bias reversal, an NPN transistor may be used. The base and collector of a PNP transistor are negatively biased. It is desirable that the collector be more negative than the base. Therefore, resistor 25 is smaller than resistor 26. Suitable values are 10K ohms for resistor 26 and 1K ohm for resistor 25. The emitter of the transistor is grounded through resistor 27 (about 1K ohm) and capacitor 28 (about 10 $\mu$f.). $V_{cc}$ is about −10 volts.

Often with low level signals from a barrier-type photocell, it is desirable to use more than one amplification stage on the signal before transmitting it over a line. The output of the first transistor amplifier, shown in FIG. 5, is then passed through another transistor amplifier, which may be the same as the one in FIG. 5. The signal output of the two series transistor amplifiers is then usually of sufficient amplitude to be transmitted across a line without noise problems. This permits any remaining amplification required to be carried out away from the location of the photoelectric devices.

Figure 6:
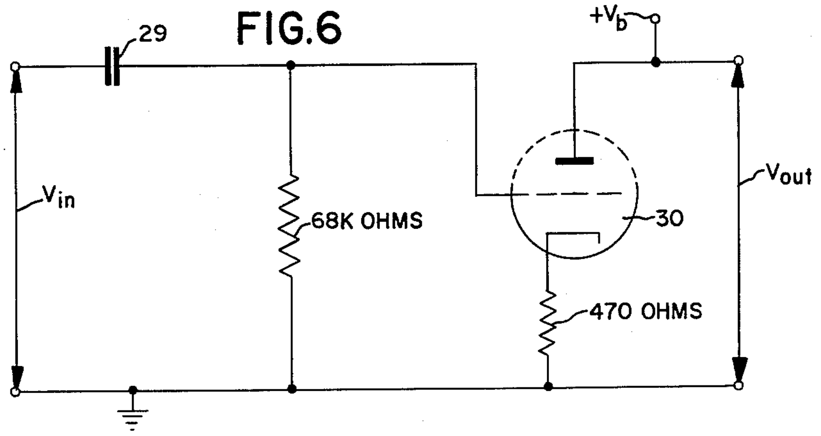
FIG. 6 is a schematic circuit diagram of a vacuum tube amplifier.

Because a larger amount of amplification may be obtained with a single device, it is often desirable for the next stage of amplification to be a vacuum tube amplifier. This stage is located away from the photocell-containing apparatus. Thus, ruggedness of the tubes is no longer a factor. Such amplifiers are conventional. One of them is shown in FIG. 6. The output of the transistor amplifier or amplifiers is the input of this vacuum tube amplifier. The input is first passed through a capacitor 29 (about 0.02 $\mu$f.) to eliminate the D.-C. component of the output of the transistor amplifier. In the vacuum tube amplifier as shown, one-half of a 12AT7 tube 30 is used. The other half is used for another identical amplifier for amplifying another channel. The plate voltage $V_b$ (about 250 v. for a 12AT7) is applied as shown. The A.-C. output signal of this amplifier is then of a sufficient level to be transmitted to the switching circuit.

Figure 7:
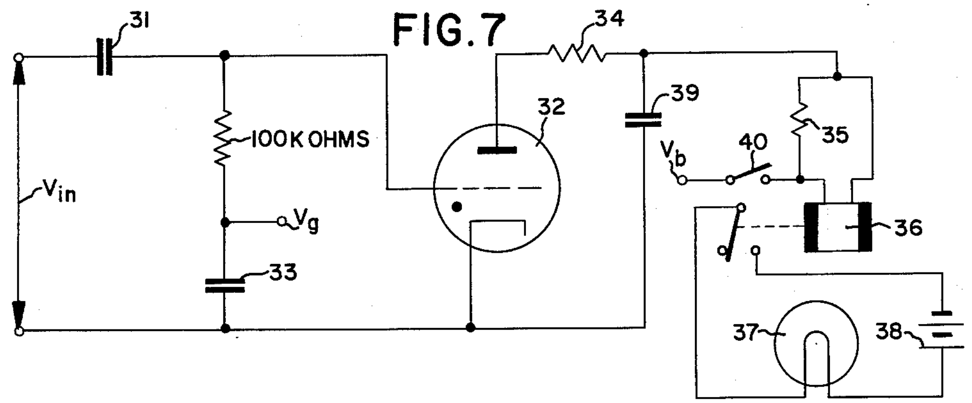
FIG. 7 is a schematic circuit diagram of one embodiment of the switching apparatus of the invention, showing symbolically how a switch is operated to turn a light on and off.

The switching circuit of one embodiment of the invention is shown in FIG. 7. The output of the vacuum tube amplifier is the input to the switching circuit. This input is passed through a capacitor 31 (.02 $\mu$f.), again to remove any D.-C. components which come from the vacuum tube amplifier. The grid voltage $V_g$ is set at a constant D.-C level (−30 v. D.-C.). When this level is increased sufficiently by an A.-C. voltage signal, the thyratron (2D21) tube 32 will fire. Capacitor 33 (200 $\mu$f.) is used to shunt any spurious signals which might come from the girds of other tubes (of other channels) since oll the tubes of all channels have a common grid supply voltage $V_g$. When the A.-C. voltage input to the grid causes the thyratron tube 32 to fire, a current flows through resistor 34 ( 1.5K ohms), resistor 35 (100K ohms), and relay 36. The current in relay 36 causes its switch to close, turning on light 37 powered by battery 38. This light and battery are merely symbolic of a light and battery in the light matrix. Actually, two relays must close in order to turn on one of the lights in the matrix. Capacitor 39 (0.01 $\mu$f.) removes any A.-C. spikes which occur as the thyratron tube 32 fires, to prevent the firing of one thyratron from causing others in other channels to fire because of their common plate voltage. Similarly, resistor 35 protects the relay against these spikes and the rest of the circuit from any signals generated by the relay.

The constant D.-C. grid voltage $V_g$ of all the switching circuits may be varied to adjust the switching level. For example, suppose only balls pitched at a speed of at least one hundred feet per second are to register on the indicator panel. $V_g$ may then be adjusted so that a larger A.-C. input to the switching circuit is required to fire thyratron tubes 32 of each switching circuit.

Once thyratron tube 32 is fired and is conducting, a subsequent removal of the A.-C. input voltage will not cut it off. The D.-C. voltage $V_g$ is sufficient to keep the tube conducting. A plate current switch 40 has been included in the circuit. Tube 32 is cut off by opening switch 40, thus cutting off the plate current. Then the tube will not again conduct until another A.-C. input signal is received by the switching circuit. In practice, switch 40 may be a foot pedal (located at the pitching mound), or a timing device, so that the circuits are reset periodically. The device may be coin-operated, providing a given number of resets per coin.

Figure 8:
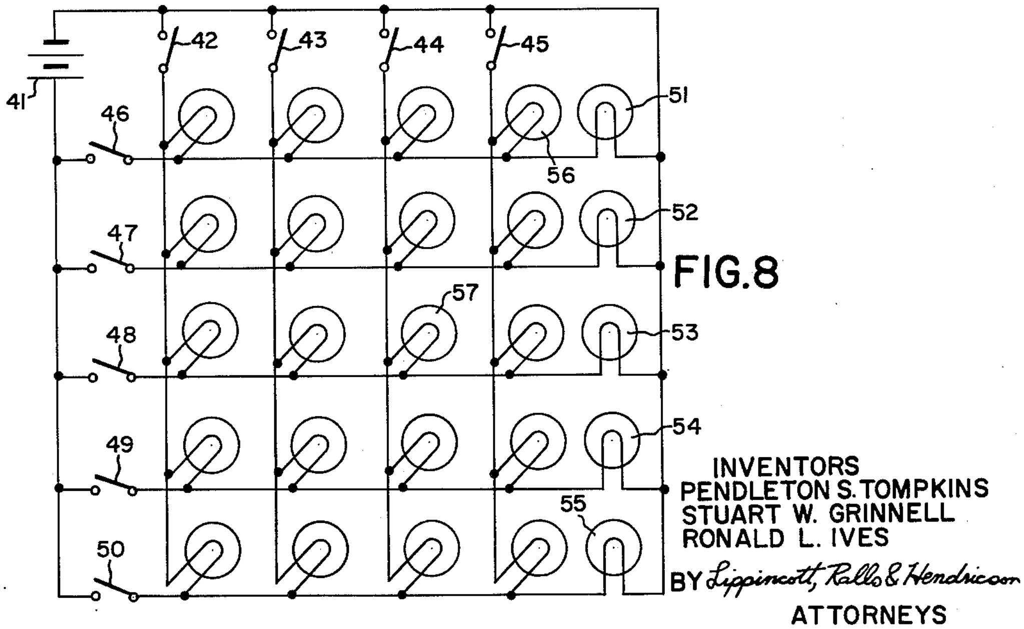
FIG. 8 is a schematic circuit diagram of a representative matrix of twenty visible lights and five hidden balancing lights.

The light matrix of the indicator panel is shown in FIG. 8. Power supply 41 is shown as a battery. However, any suitable A.-C. or D.-C. power supply may be used. Switches 42–50 are merely schematic representations of each relay 36 of the switching circuits of FIG. 7. Only the left-hand lights 4 in each row are exposed. Lights 51–55 are hidden, and are only used to balance the circuit, because there are more vertical then horizontal lights. Although twenty indicating lights are used in the illustration, many more may actually be employed. In practice, a 10 x 14 light matrix has been used (longer vertically).

The operation of this circuit is very simple. Suppose a ball crossing two beams causes relays 45 and 46 to close. Light 56 is then lighted. If relays 44 and 48 are closed, light 57 is lighted. The other lights are lighted in a similar fashion. Light 51 is lighted along with light 56, and light 53 along with light 57. But lights 51 and 53 are not exposed in the indicator panel.

Where the device is used as an umpire for an actual baseball game, the frame containing the photoelectric devices is made larger to permit the batter to stand within the frame and swing his bat without hitting it. Padding may be provided to protect the frame. The bottom part of the frame is buried beneath the ground so that it does not interfere with the location of home plate. Since the path of a pitched ball is substantially level over home plate, the accuracy of the device is not impaired by locating the apparatus slightly behind home plate to leave home plate free for the runners.

Of course, the device may also be used in amusement parks. In that instance, there need not be a real catcher. The pitch may be aimed at a cloth picture of a catcher behind the apparatus. Contrary to the prior-art devices, however, this simulated catcher may be located a few feet behind home plate for added realism. The apparatus of the invention will still detect the exact position of the ball as it crosses home plate.

The device is extremely useful for baseball team pitching practice. A pitcher may aim his pitches for a particular portion of the strike zone. As is well known, it is important for a pitcher to be able to control his pitches. Each batter is known to have weaknesses in certain areas of the zone. With the device, the pitcher knows just where his pitches cross home plate, thus allowing him to improve his accuracy.

As will be obvious to one skilled in the art, many modifications may be made in the circuits and apparatus of the invention as described above which are still within the spirit and scope of the invention. Therefore, the only limitations to be placed on that scope are those which are expressed in the claims which follow.

What is claimed is:

1. An electronic pitching aid which comprises:

a matrix of photoelectric devices, each having an artificial light beam and associated photocell, said matrix being planar and covering at least the zone through which a ball must pass to be a strike, wherein each of said photocells provides a signal when its associated light beam is interrupted and said signal has a duration proportional to the time for which the beam is interrupted, means for individually sorting each of said signals from said photocells on the basis of their duration, and passing only those of said signals of less than a preselected duration, means for amplifying the passed signals, a matrix of lights having one light which corresponds to each intersection of two light beams in said matrix of photoelectric devices, and switching means associated with each photocell and caused to switch by one of the amplified signals, said switching means connected to said matrix of lights so that the light corresponding to said intersection of two particular light beams is switched on when a signal of less than the preselected duration is sent by both of the two photocells associated with those intersecting light beams.

2. An electronic pitching aid which comprises:

photoelectric means for generating a planar matrix of light beams and providing a signal indicating the location in which an object passes home plate, said signal having a duration proportional to the time said object interrupts said beams, means for passing only those of said signals having less than a preselected duration, and means for switching on a light indicating said location in response to a passed signal.

3. The electronic pitching aid of claim 2 wherein said switching means is adjustable to preselect said duration.

4. The electronic pitching aid of claim 2 wherein said passing means comprises a capacitor in series with the source of said signal.

5. The electronic pitching aid of claim 4 wherein the capacitance of said capacitor is selected along with the adjustment of said switching means to preselect said duration.

6. The electronic pitching aid of claim 5 wherein said switching means includes a thyratron tube and said adjustment is made on the D.-C. grid voltage of that tube.

7. An electronic pitching aid comprising a plurality of artificial light sources and corresponding plurality of photocells spaced from the sources and receiving light beams therefrom, some of said beams being horizontally directed and others being vertically directed to define a planar matrix covering at least the zone thorugh which a ball must pass to be a strike, each of said photocells providing a signal in response to its associated light beam being interrupted and the duration of the signal being proportional to the time during which the beam is interrupted, a series capacitor and shunt resistor coupled to the output of each photocell to generate pulses having magnitude proportional to the time derivative of signals received therefrom, means for amplifying said pulses, a matrix of lights having one light corresponding to each intersection of two beams in said matrix thereof, a trigger circuit associated with each photocell and receiving the amplified pulses originated therefrom, said trigger circuit having a predetermined triggering level such that output current flows only in response to pulses having magnitudes greater than said level, and switching means coupled to said trigger circuits and switched by the flow of output current therein, said switching means connected to said matrix of lights so that the light corresponding to the intersection of two particular light beams is energized by the flow of output current in the trigger circuits associated with the photocells receiving said two particular beams.

References Cited by the Examiner

UNITED STATES PATENTS

| | | | |
|---|---|---|---|
| 2,040,228 | 5/1936 | Whiteley | 273—26(1) |
| 2,581,738 | 1/1952 | Williams | 273—185 X |
| 2,653,309 | 8/1953 | Hausz | 340—228 |
| 3,036,219 | 5/1962 | Thompson | 273—102.2 X |

RICHARD C. PINKHAM, *Primary Examiner.*

DELBERT B. LOWE, *Examiner.*